Jan. 2, 1923.

J. H. HUBBLE.
CUSHIONED WHEEL.
FILED AUG. 31, 1920.

Inventor:
J. H. Hubble,
by Lacy & Lacy, Attys.

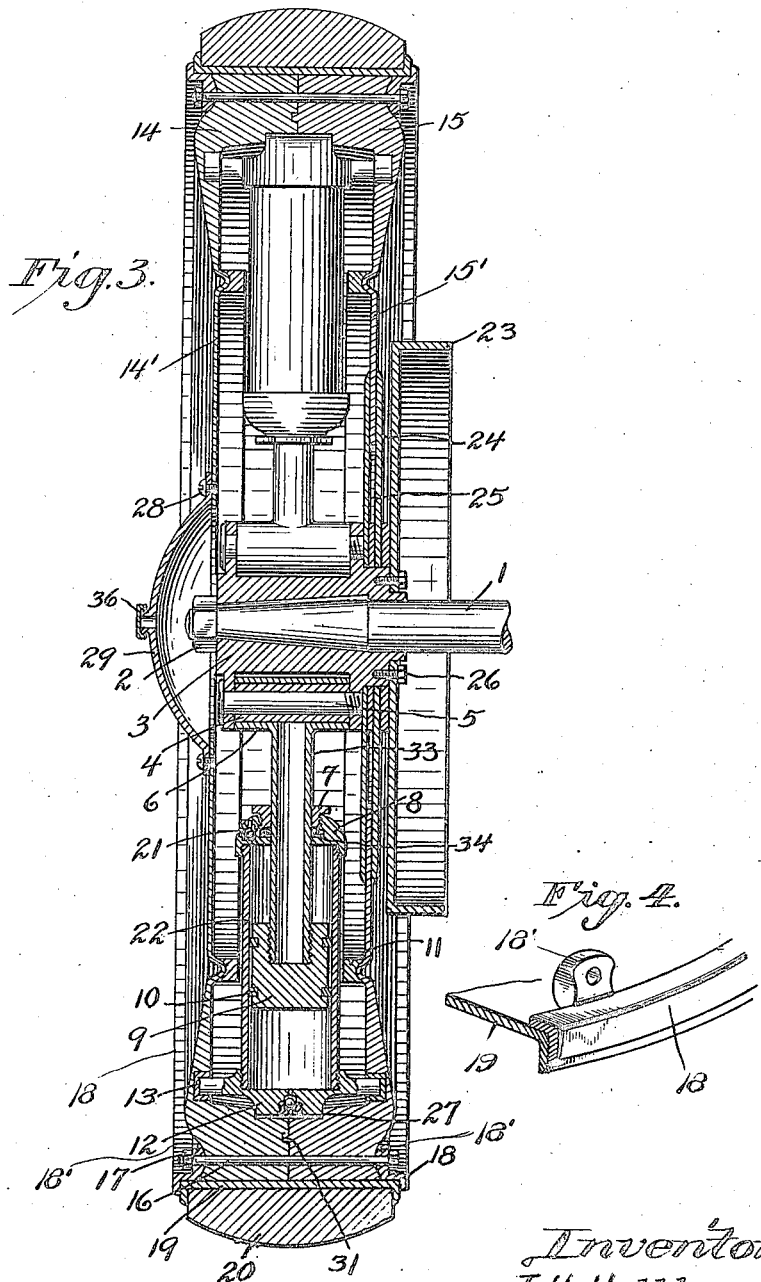

Patented Jan. 2, 1923.

1,441,093

UNITED STATES PATENT OFFICE.

JOSEPH H. HUBBLE, OF TEKOA, WASHINGTON, ASSIGNOR OF ONE-THIRD TO GRANT McCANN AND ONE-THIRD TO ROBERT L. RAGON, BOTH OF TEKOA, WASHINGTON.

CUSHIONED WHEEL.

Application filed August 31, 1920. Serial No. 407,267.

*To all whom it may concern:*

Be it known that I, JOSEPH H. HUBBLE, citizen of the United States, residing at Tekoa, in the county of Whitman and State of Washington, have invented certain new and useful Improvements in Cushioned Wheels, of which the following is a specification.

This invention relates to improvements in vehicle wheels and more particularly to that type provided with pneumatic cushioning means, the general object of the invention being to provide a wheel which, although it will employ solid tires, will possess substantially the same resiliency as a wheel equipped with pneumatic tires.

One object of the invention is to so construct the pneumatic cushioning devices for the wheel that these devices will be actuated automatically to take in the required volume of air to produce the desired cushioning effect and will act effectually to absorb all shocks and impacts incident to travel of the wheel over rough road surfaces.

Another object of the invention is to provide a wheel of the class mentioned which is simple and durable in construction and equally as substantial as a wheel having rigid spokes.

In the accompanying drawings:

Figure 3 is a vertical diametric sectional view through the wheel.

Figure 4 is a perspective view of a fragment of the rim and annular rim-securing member.

Figure 1:
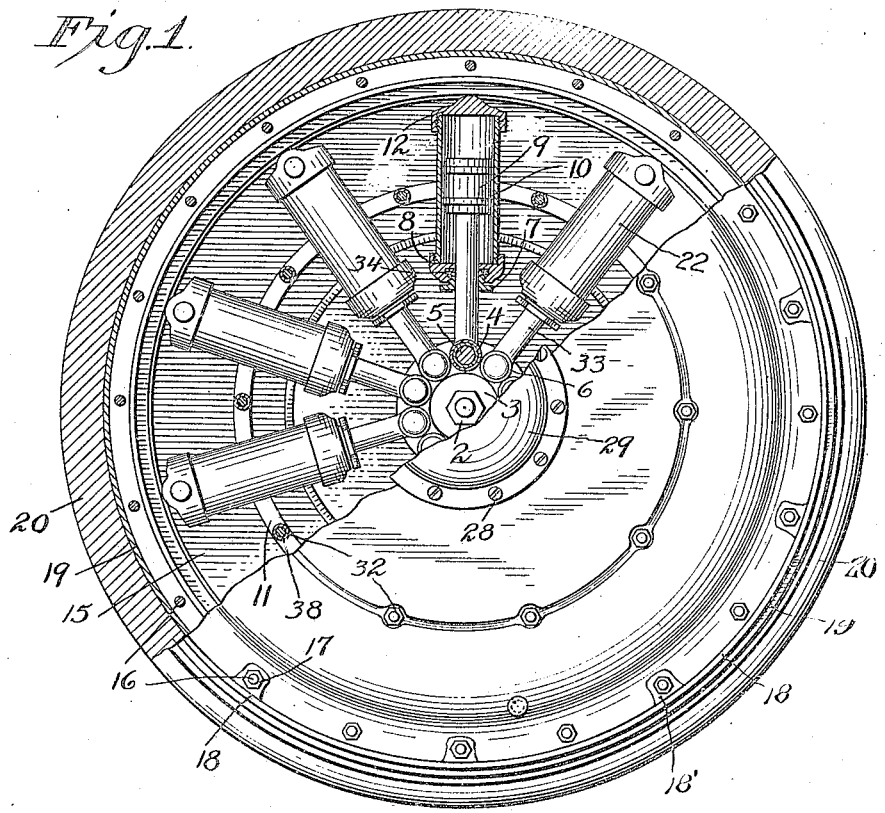
Figure 1 is a view partly in side elevation and partly in vertical section illustrating a wheel constructed in accordance with the invention.
Figure 2:
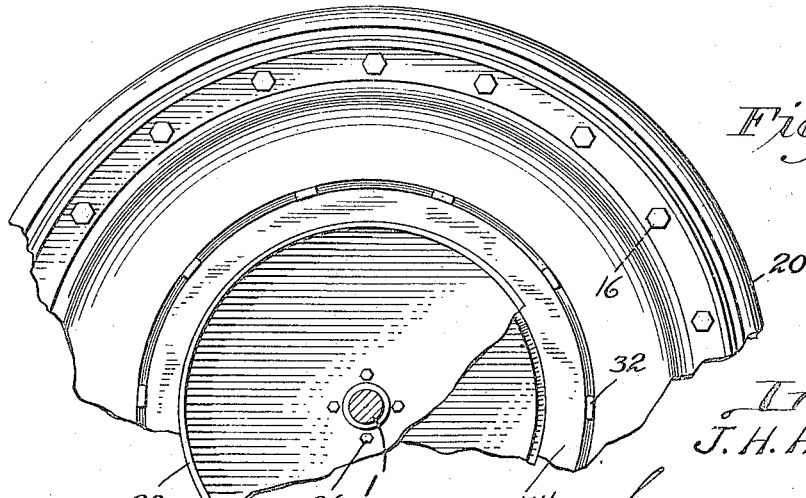
Figure 2 is a view similar to Figure 1 looking at the opposite side of the wheel, a portion of the brake drum being broken away.

The wheel embodying the invention comprises a hub 3 which is peripherally channeled so as to provide spaced flanges and which is adapted to be fitted for example upon the spindle of the axle shaft 1 and secured in place by means of a nut 2. Bolts 5 are secured through the flanges of the hub 3 and extend across the channeled periphery of the hub and constitute wrist pins upon which are fitted sleeves 6 formed at the inner ends of piston rods 33 which constitute parts of the spokes of the wheel, the sleeves 6 having bearing upon sleeves or bushings 4 of any suitable anti-friction metal, fitted upon the said bolts 5. The piston rods 33 are fitted slidably through the heads 8 of air cylinders 22, stuffing boxes 7 being provided upon these heads 8 and housing packing glands 34 which provide an airtight fit between the piston rods and the heads of the cylinders. Each cylinder 22 is provided at its outer end with a head 12 having oppositely projecting trunnions fitting in suitable bearings 13 formed in the side members of the felly of the wheel, which portion of the wheel will presently be more specifically described. A piston head 9 is fitted on to the inner end of each piston rod 33 and is provided with the usual piston rings 10 providing for the air-tight fit of the piston in the respective cylinder. Check valves 21 and 27 are arranged within the heads 8 and 12 respectively of the cylinders and it will be evident particularly by reference to Figure 3 that when the piston 9 is moved in the direction of the head 12 of the respective cylinder, air will be compressed in this end of the cylinder and air will be drawn into the other end of the cylinder past the valve 21. On the other hand when the piston 9 is moving in the opposite direction, air taken into the last mentioned end of the cylinder will be trapped and compressed, and air will be drawn into the first mentioned end of the cylinder past the valve 27.

The felly of the wheel above referred to comprises sections 14 and 15 which are disposed face to face and are provided at their contacting faces with a tongue and groove joint 31 which prevents relative radial displacement of the said sections. The tire for the felly is indicated by the numeral 20 and may be of any of the ordinary solid types and the same is mounted upon a rim 19 which circumferentially fits the felly and is retained in place by annular rim members 18 secured in place by bolts 16 which extend through lugs 18′ on the inner edges of these members and through the sections 14 and 15 of the felly and which are provided with nuts 17 which may be tightened against said lugs to bind the parts together or which may be removed to permit of separation of the parts. The sections 14 and 15 of the felly are provided with integral web portions indicated respectively by the numerals 14' and 15', and the said web portions 14' and 15' are preferably reinforced by annular members 11 disposed against their inner sides, bolts 32 being passed through the said portions 14' and 15' and the said members 11, being provided with spacing sleeves 38, which engage at their ends against the members 11 and hold the same properly spaced.

The web portion 14' has a central opening through which access may be had to the nut 2 for the purpose of removing the same prior to removal of the wheel from the axle, and this opening is covered by a cap plate 29 secured in position as for example by screws 28 and provided with a filling opening 36 through which lubricant may be introduced into the interior of the wheel.

The web 15' is likewise formed centrally with an opening which surrounds the inner end of the hub 3 and is suitably spaced therefrom, and the inner peripheral portion of the web 15' works slidably between guard plates 24 and 25 which are assembled in spaced relation upon the inner end of the hub and serve to close the opening in the said web 15'. These plates 24 and 25 as well as the spacing means therefor are retained in place by the brake drum 23 which is fitted on to the inner end of the hub 3 and secured in place by means of bolts 26.

From the foregoing description of the invention it will be understood that as the wheel passes over the road surface and sustains the weight of the load, its cushioning cylinders 22 will be moved inwardly and outwardly with the displacement of the felly or body of the wheel with relation to the hub, and in this movement the cylinders and their respective pistons 9 will be relatively reciprocated, thus alternately drawing air into one end of each cylinder and compressing it in the other end. Thus as the cushioning devices travel upwardly in the rotation of the wheel, air will be drawn into the outer ends of the cylinders, and as the cylinders pass downwardly, this trapped air is compressed and serves to cushion and sustain the load imposed upon the wheel.

Having thus described the invention, what is claimed as new is:

1. In a cushioned wheel, a hub, a felly, cushioning means connecting the same and comprising a plurality of cylinders and associated pistons, each of said cylinders having air inlets communicating with each of its ends, and check valves in the said air inlets.

2. In a cushioned wheel, a hub, a felly, air cylinders pivotally connected at their outer ends with the felly, pistons pivotally connected at their inner ends with the hub and working in the said cylinders, each cylinder having an air inlet communicating with each of its ends, and check valves in said inlets.

3. In a cushioned wheel, a hub having circumferential flanges, wrist pins mounted at their ends in the flanges and extending parallel to the axis of the hub, spoke sections comprising stems and transverse bearing collars at the inner ends of the stems, the said collars fitting the said wrist pins, a piston fixed upon the outer end of the stem, a second spoke section associated with each of the first mentioned sections and comprising a cylinder having a head provided with trunnions, the cylinder receiving the said piston and being provided with another head through which the stem of the respective spoke section is slidably fitted, a felly including circumferential side flanges, bearings in the said flanges receiving the trunnions upon the first mentioned head of the cylinder, said flanges extending to points adjacent the hub, a cap plate secured to that flange nearer the outer end of the hub, and guard plates extending from the inner end of the hub and slidably receiving the adjacent flange.

In testimony whereof I affix my signature.

JOE H. HUBBLE. [L. S.]